United States Patent [19]
Hikasa et al.

[11] Patent Number: 5,407,991
[45] Date of Patent: Apr. 18, 1995

[54] THERMOPLASTIC ELASTOMER COMPOSITION, COVERING MATERIALS FOR INDUSTRIAL PARTS COMPRISING THE COMPOSITION AND LAMINATES COMPRISING THE COVERING MATERIALS

[75] Inventors: Tadashi Hikasa, Sodegaura; Koji Yamashita, Sodegaura; Satoru Hosoda, Ichihara; Kiyoshi Mitsui, Takatsuki; Yuji Kanda, Ichihara, all of Japan

[73] Assignee: Sumitomo Chemical Co., Ltd., Osaka, Japan

[21] Appl. No.: 141,668

[22] Filed: Oct. 26, 1993

[30] Foreign Application Priority Data

Oct. 26, 1992 [JP] Japan .................................. 4-287373

[51] Int. Cl.$^6$ ................................................ C08K 5/01
[52] U.S. Cl. .................................... 524/491; 524/525; 524/571; 524/574
[58] Field of Search ............... 524/491, 525, 571, 574

[56] References Cited

U.S. PATENT DOCUMENTS 3,306,558  4/1974  Fischer .
4,247,652  1/1981  Matsuda et al. .
4,801,651  1/1989  Komatsu et al. ............ 524/525
5,118,253  6/1992  Hikasa et al. ................ 524/525
5,118,753  6/1992  Hikasa et al. .

Primary Examiner—Paul R. Michl
Assistant Examiner—Edward Cain
Attorney, Agent, or Firm—Cushman Darby & Cushman

[57] ABSTRACT

The invention provides an olefinic thermoplastic elastomer composition which is excellent in flexibility, processability into sheet and appearance of the resulting sheet and which is able to substitute for flexible polyvinyl chloride. The invention further provides a covering material for industrial parts comprising said composition and a laminate comprising said covering material.

The composition comprises a partially crosslinked thermoplastic elastomer I containing an oil-extended olefinic copolymer rubber comprising an olefinic copolymer rubber having a Mooney viscosity of 200–350 or the thermoplastic elastomer I and a partially crosslinked thermoplastic elastomer II containing an oil-extended olefinic copolymer rubber comprising an olefinic copolymer rubber having a Mooney viscosity of 120 or higher and lower than 200 and the composition has a specific viscoelastic characteristics.

12 Claims, No Drawings

THERMOPLASTIC ELASTOMER COMPOSITION, COVERING MATERIALS FOR INDUSTRIAL PARTS COMPRISING THE COMPOSITION AND LAMINATES COMPRISING THE COVERING MATERIALS

The present invention relates to thermoplastic elastomer compositions, covering materials for industrial parts comprising said compositions and laminates comprising said covering materials. More particularly, it relates to thermoplastic elastomer compositions suitable for covering materials which are excellent in flexibility and processability and are able to substitute for flexible polyvinyl chloride, and it further relates to covering materials for industrial parts comprising the compositions and laminates comprising the covering materials.

Use of thermoplastic elastomers is being developed in a wide variety of fields of industrial parts such as automobile parts, electrical appliance parts and sundries taking advantage of the characteristics that they require no vulcanizing step and are able to be processed by molding machines for thermoplastic resins. Among them, olefinic thermoplastic elastomer compositions are known (Japanese Patent Kokai No. 48-26838).

Hitherto, high-graded shaped articles of thermoplastic resins are known, which have been enhanced in appearance and soft hand by laminating covering materials on the surfaces of the shaped articles. The covering materials are flexible polyvinyl chloride and olefinic thermoplastic elastomers backed with a foamed layer such as of polyolefin, polyurethane resin or the like in order to impart cushioning properties.

However, covering materials comprising polyvinyl chloride are high in specific gravity and inferior in light resistance. Surface appearance is greatly deteriorated when they are used as covering materials which are directly exposed to sunlight. Furthermore, a problem is encountered in that, for instance, automobile windshields cloud when interior trims are made of said covering materials, since the covering materials contain a large amount of plasticizers for providing flexibility. Moreover, there are problems that it is impossible to throw the wastes into the fire from a viewpoint of environmental health, since polyvinyl chloride when burned generates hydrochloric acid gas. Furthermore, the processing apparatuses are corroded.

Furthermore, when conventional olefinic thermoplastic elastomers are used as covering materials, though the problems encountered for the flexible polyvinyl chloride are partly solved, further improvement is demanded because they can be hardly applied to the uses which require highly balanced flexibility and processability and besides, from the point of processability, there occurs the phenomenon (called debossing phenomenon) that the emboss patterns previously transferred to a sheet to be used as a covering material disappear when the sheet is subjected to drape vacuum forming under streching with heating.

An object of the present invention is to solve the problems encountered in the conventional techniques, and to provide a thermoplastic elastomer composition suitable for use as covering materials which require high flexibility and processability, a covering material for industrial parts which comprises said composition, and a laminate comprising said covering material.

After intensive research for solving the above problems, the inventors have found that a thermoplastic elastomer composition having superior balancing of flexibility and processability can be obtained by using a thermoplastic elastomer having a specific stress relaxation characteristic in thermoplastic elastomer compositions comprising oil-extended olefinic copolymer rubbers prepared by adding a mineral oil to olefinic copolymer rubbers having a specific Mooney viscosity, and covering materials comprising said composition and laminates comprising said covering materials are suitable for industrial parts which require highly balanced flexibility and processability.

That is, the present invention relates to a thermoplastic elastomer composition comprising:

(i) 55–100% By weight of a thermoplastic elastomer I obtained by partially crosslinking a mixture consisting essentially of (A) 50–90 parts by weight of an oil-extended olefinic copolymer rubber containing 60–150 parts by weight of a mineral oil every 100 parts by weight of an olefinic copolymer rubber having a 100° C. Mooney viscosity ($ML_{1+4}$ 100° C.) of 200–350 and (C) 50–10 parts by weight of an olefinic polymer resin, (ii) 45–0% by weight of a thermoplastic elastomer II obtained by partially crosslinking a mixture consisting essentially of (B) 50–80 parts by weight of an oil-extended olefinic copolymer rubber containing 10–60 parts by weight of a mineral oil every 100 parts by weight of an olefinic copolymer rubber having a 100° C. Mooney viscosity ($ML_{1+4}$ 100° C.) of 120 or higher and lower than 200 and (D) 50–20 parts by weight of an olefinic polymer resin, and (iii) 0–30% by weight of (E) an olefinic polymer resin, and said composition having a 90% stress relaxation time of 0.1–10 seconds in measurement of viscoelasticity at 180° C.

Furthermore, the present invention relates to a covering material for industrial parts which is obtained by subjecting the thermoplastic elastomer composition to drape vacuum forming and a laminate obtained by laminating a polyolefin foam or a polyurethane foam under the covering material.

The present invention will be explained in detail.

The olefinic copolymer rubbers used for the oil-extended olefinic copolymer rubbers (A) and (B) are amorphous random elastic copolymers mainly composed of olefins such as ethylene-propylene copolymer rubber, ethylene-propylene-nonconjugated diene terpolymer rubber, ethylene-1-butene copolymer rubber, ethylene-1-butene-nonconjugated diene terpolymer rubber and propylenebutadiene copolymer rubber. Among them, ethylenepropylene and/or 1-butene-nonconjugated diene terpolymer rubbers are especially preferred. The nonconjugated dienes include, for example, dicyclopentadiene, 1,4-hexadiene, cyclooctadiene, methylenenorbornene and ethylidenenorbornene, and dicyclopentadiene and/or ethylidenenorbornene are especially preferred.

More preferred specific examples are ethylenepropylene-dicyclopentadiene and/or ethylidenenorbornene terpolymer rubbers having a propylene content of 10–55% by weight, preferably 20–40% by weight and a dicyclopentadiene and/or ethylidenenorbornene content of 1–30% by weight, preferably 3–20% by weight.

If the propylene content is smaller than 10% by weight, flexibility is apt to be lost and if it is greater than 55% by weight, mechanical properties tend to deteriorate. If the nonconjugated diene content is smaller than 1% by weight, mechanical properties tend to deteriorate and if it is greater than 30% by weight, processability to sheet tends to deteriorate.

The 100° C. Mooney viscosity ($ML_{1+4}$ 100° C.) of the olefinic copolymer rubbers is 200–350, preferably 200–300, more preferably 220–280 for (A) and 120 or higher and lower than 200, preferably 130–170 for (B).

According to the present invention, high balancing of flexibility and processability with maintaining high mechanical properties has been attained by providing the thermoplastic elastomer I (hereinafter referred to as "TPE-I") comprising the olefinic copolymer rubber (hereinafter referred to as "EPDM-A") having the relatively high $ML_{1+4}$ 100° C. (200–350), or by the combination of TPE-I with the thermoplastic elastomer II (hereinafter referred to as "TPE-II") comprising the olefinic copolymer rubber (hereinafter referred to as "EPDM-B") having an $ML_{1+4}$ 100° C. (120 or higher and lower than 200) which is lower than that of EPDM-A.

If $ML_{1+4}$ 100° C. of EPDM-B is lower than 120, mechanical properties are damaged and if that of EPDM-A is higher than 350, processability is damaged and appearance of the shaped articles is deteriorated.

The mineral oil used in the present invention is petroleum fractions of high boiling points useful for improvement of processability or mechanical properties. They include paraffinic, naphthenic and aromatic petroleum fractions and the paraffinic ones are preferred. When aromatic components increase, contamination occurs and light resistance decreases.

The oil-extended olefinic copolymer rubber comprising EPDM-A (oil-extended EPDM-A) contains 60–150 parts by weight, preferably 60–130 parts by weight, more preferably 70–120 parts by weight of the mineral oil every 100 parts by weight of EPDM-A. The oil-extended olefinic copolymer rubber comprising EPDM-B (oil-extended EPDM-B) contains 10–60 parts by weight, preferably 20–60 parts by weight, more preferably 20–50 parts by weight of the mineral oil every 100 parts by weight of EPDM-B.

Since EPDM-A and EPDM-B in the present invention are relatively higher in 100° C. Mooney viscosity ($ML_{,1+4}$ 100° C.) as compared with usual olefinic copolymer rubbers, if the amount of the mineral oil is less than 10 parts by weight in EPDM-B, flowability of the elastomer composition is low and especially extrusion processability and calendering processability are damaged and if it is more than 150 parts by weight in EPDM-A, plasticity markedly increases to deteriorate processability and furthermore, performances of the products such as mechanical properties are deteriorated. The 100° C. Mooney viscosity ($ML_{1+4}$ 100° C.) of oil-extended EPDM-A and EPDM-B is preferably 30–150, more preferably 40–100. If it is lower than 30, mechanical properties are lost and if it is higher than 150, mold processing tends to become difficult.

Next, taking the olefinic copolymer rubber (EPDM) as an example, properties of oil-extended olefinic copolymer rubbers (oil-extended EPDM) and process for preparation thereof are explained.

Incorporation of the mineral oil in a large amount into EPDM having $ML_{1+4}$ 100° C. of as high as 120–350 gives olefinic thermoplastic elastomer compositions which satisfy simultaneously having flexibility and an improvement in processability due to increase of flowability as well as an improvement in mechanical characteristics.

In general, mineral oil is added to olefinic thermoplastic elastomer compositions as flowability improvers. According to the research conducted by the inventors, addition of 40 parts by weight or more of the mineral oil to 100 parts by weight of EPDM brings readily about bleeding of the mineral oil on the surface of the elastomer composition, resulting in a stain and tackiness, when no oil-extended EPDM is used.

However, the use of an oil-extended EPDM in which 150 parts by weight or less of the mineral oil has been incorporated into 100 parts by weight of EPDM having an $ML_{1+4}$ 100° C. of, for example, 120–350 gives elastomer compositions having little bleeding of the mineral oil, neither stain nor tackiness and excellent properties in tensile strength, breaking extension and compression set. No bleeding of the mineral oil in spite of a large amount of the mineral oil is considered due to a raise in the upper limit of allowable oil-extension amount of the mineral oil on the basis of EPDM of relatively high Mooney viscosity and uniform dispersion of the mineral oil which has been previously and properly added in EPDM.

Oil extension in EPDM-A and EPDM-B is performed by known methods. For example, EPDM-A or EPDM-B and the mineral oil are mechanically kneaded in apparatuses such as rolls and Banbury mixers. Another method is adding a given amount of the mineral oil to an EPDM-A or EPDM-B solution and thereafter removing the solvent by steam stripping or the like. Preferred is to use an EPDM-A or EPDM-B solution obtained by polymerization, from a view point of operation.

Polypropylene resins are preferred as the olefinic polymer resins (C), (D) and (E) used in the present invention. Preferred as the polypropylene resins are polypropylene and/or random or block copolymer resins of propylene and α-olefins of 2 or more carbon atoms. Examples of α-olefins of 2 or more carbon atoms are ethylene, 1-butene, 1-pentene, 3-methyl-1-butene, 1-hexene, 1-decene, 3-methyl-l-pentene, 4-methyl-1-pentene and 1-octene. Melt flow rate of these polymer resins is preferably 0.1–50 g/10 min, more preferably 0.5–30 g/10 min. If the melt flow rate is smaller than 0.1 g/10 min or greater than 50 g/10 min, problems may occur in processability to sheets. Said olefinic polymer resins (C), (D) and (E) may be the same or different.

In the present invention, blending ratio of the components in the mixture comprising oil-extended EPDM-A (A) and olefinic polymer resin (C) or the mixture comprising oil-extended EPDM-B (B) and olefinic polymer resin (D) is as follows.

That is, amounts of the component (C) and (D) are 50–10 parts by weight and 50–20 parts by weight per 50–90 parts by weight of the oil-extended EPDM-A and 50–80 parts by weight of the oil-extended EPDM-B (B), respectively.

In these mixtures, if the amount of the component (C) or (D) is less than 10 parts by weight or 20 parts by weight, flowability decreases to result in bad appearance of molded articles. If it is more than 50 parts by weight, flexibility degrades.

Organic peroxides are suitable as crosslinking agents for partial crosslinking of the above mixtures.

The organic peroxides include, for example, 2,5-dimethyl-2,5-di(t-butylperoxy)hexane, 2,5-dimethyl-2,5-di(t-butylperoxy)hexyne-3, 1,3-bis(t-butylperoxyisopropyl)benzene, 1,1-di(t-butylperoxy)-3,5,5-trimethylcyclohexane, 2,5-dimethyl-2,5-di(peroxybenzoyl)hexyne-3 and dicumyl peroxide. Among them, preferred is 2,5-dimethyl-2,5-di(t-butylperoxy)hexane from the points of smell and scorching.

The amount of the organic peroxide is preferably in the range of 0.01–1.0 part by weight on the basis of 100 parts by weight of the mixture. If it is less than 0.01 part by weight, the effect of crosslinking reaction is small and if it is more than 1.0 part by weight, control of the reaction is difficult and besides, such amount is not economical.

Partial crosslinking with organic peroxides may be effected in the presence of crosslinking aids. They are, for example, functional compounds such as N,N'-m-phenylenebismaleimide, toluylenebismeleimide, p-quinone dioxime, nitrobenzene, diphenylguanidine, trimethylolpropane, divinylbenzene, ethylene glycol dimethacrylate, polyethylene glycol dimethacrylate, trimethylolpropane trimethacrylate and allyl methacrylate. Addition of such functional compound serves for a homogeneous and gentle crosslinking reaction, resulting in an improvement in mechanical properties.

Amount of the crosslinking aids is preferably in the range of 0.01–2.0 parts by weight, more preferably 0.05–1.0 part by weight based on 100 parts by weight of the mixture. If it is less than 0.01 part by weight, the effect is not expected and if it exceeds 2.0 parts by weight, this is not economical.

One of methods for preparing the elastomer composition by partially crosslinking the above-mentioned mixtures according to the present invention is explained below.

Oil-extended EPDM-A or oil extended EPDM-B, olefinic polymer resin (C) or (D) and organic peroxide and optionally, crosslinking aid and others are mixed at a given ratio and the respective mixture is subjected to a dynamic heat treatment. That is, the mixture is molten and kneaded. Non-open type Banbury mixers, twin-screw extruders and the like are used. Kneading temperature is usually in the range of 150°–300° C. and kneading time is usually in the range of 1–30 minutes. If necessary, there may be further added auxiliary materials such as inorganic fillers, antioxidants, weather-resistant agents, antistatic agents and coloring pigments.

In more detail, oil-extended EPDM-A or oil extended EPDM-B, olefinic polymer resin (C) or (D) and optionally, the crosslinking aid and the auxiliary materials are mixed at a given ratio and the respective mixture is sufficiently kneaded and homogenized at a temperature in the range of 150°–250° C. in, for example, a non-open type kneader such as Banbury mixer. Then, the resulting composition is sufficiently blended with organic peroxides in enclosed mixers such as tumblers and super mixers. The resulting blend is subjected to a dynamic heat treatment at a temperature in the range of 200°–300° C. in twin-screw continuous extruders which provide a strong kneading force to obtain partially crosslinked TPE-I or TPE-II.

As the auxiliary materials, for example, antistatic agents, mention may be made of (a) cationic ones such as primary amines, tertiary amines, quaternary amines and pyridine derivatives, (b) anionic ones such as sulfonated oil, soaps, sulfonated ester oil, sulfonated amide oil, sulfate esters of olefins, sulfate esters with fatty alcohols, alkylsulfate esters, fatty acid ethyl sulfonates, alkylnaphthalene-sulfonates, alkylbenzenesulfonates, succinate ester sulfonates and phosphate esters, (c) nonionic ones such as partial fatty acid esters of polyhydric alcohols, ethylene oxide adducts of fatty alcohols, ethylene oxide adducts of fatty acids, ethylene oxide adducts of fatty acid amines or fatty acid amides, ethylene oxide adducts of alkylphenols, ethylene oxide adducts of alkylnaphthols, ethylene oxide adducts of partial fatty acid esters with polyhydric alcohols and polyethylene glycol, and (d) amphoteric ones such as carboxylic acid derivatives and imidazoline derivatives. Preferred are nonionic ones and especially preferred are polyoxyethylenealkylamines and polyoxyethylenealkylamide, fatty acid esters of them and fatty acid esters of glycerin.

The above antistatic agents may be used each alone or in combination of two or more.

Amount of the antistatic agents is preferably about 0.03–2 parts by weight, more preferably about 0.04–1 part by weight based on 100 parts by weight of the thermoplastic elastomer I or II.

If the amount is more than the above range, bleeding to the surface and deterioration of properties of the thermoplastic elastomers are brought about.

Addition of the antistatic agents gives molded articles having flexibility and free from tackiness.

Furthermore, use of the antistatic agent reduces sticking of dusts caused by no tackiness and no bleeding of the mineral oil and serves for decrease of electrical chargeability which is the inherent action of antistatic agents, resulting in decrease of sticking of dusts.

In some cases, slippariness is demanded for the surface of molded articles and higher fatty acid amides can be used for this purpose.

Examples of the higher fatty acid amides are saturated fatty acid amides such as lauric acid amide, palmitic acid amide, stearic acid amide and behenic acid amide, unsaturated fatty acid amides such as erucic acid amide, oleic acid amide, brassidic acid amide and elaidic acid amide, and bis-fatty acid amides such as methylenebisstearic acid amide, methylenebisoleic acid amide, ethylenebisstearic acid amide and ethylenebisoleic acid amide.

Especially preferred higher fatty acid amides are those which have a melting point of about 70° C.–about 110° C.

Amount of the higher fatty acid amides is preferably about 0.03–about 2 parts by weight, more preferably about 0.04–about 1 part by weight based on 100 parts by weight of the thermoplastic elastomer or II.

If the amount is more than the above range, bleeding of the higher fatty acid amide to the surface and deterioration of properties of the thermoplastic elastomer occur.

The auxiliary materials are added at any stages of preparation of the composition, at the time of processing or at the time of use of the product after processed.

The elastomer composition of the present invention has a 90% stress relaxation time of 0.1–10 seconds in measurement of the dynamic viscoelasticity referred to hereinafter. If the 90% stress relaxation time is less than 0.1 second, heat shrinkage at the time of vacuum forming is small, and wrinkles readily occur on the covering material side when the covering material is subjected to molding together with the core material. Furthermore, if it exceeds 10 seconds, residual stress at the time of embossing of a sheet for covering material increases and the residual stress is relaxed by reheating at the time of vacuum forming, resulting in decrease in retention of the transferred emboss patterns to damage the appearance.

Methods for molding into a sheet the thus obtained TPE-I or a blend of TPE-I and TPE-II include one which comprises kneading the pellets of TPE-I and TPE-II before subjecting to molding into a sheet by a kneading apparatus such as Banbury mixer, single-screw extruder or twin-screw extruder, and plasticizing the resulting pellets by a kneader of a sheet forming machine and forming into a sheet and one which comprises introducing the pellents respectively or in the form of a blend into a kneader (such as extruder or rolls) attached to a sheet forming machine to prepare a homogeneous blend and forming the blend into a sheet. The blend can be made into a homogeneous composition by subjecting it to a temperature of higher than 150° C. and application of a shear stress of a certain degree.

The process for obtaining decorative sheets is roughly divided into a rolling step and an embossing step, which are carried out either on-line or off-line. The rolling step includes rolling a thermoplastic elastomer composition melt kneaded by an extruder by rolls through a T-die or rolling a thermoplastic elastomer composition melt kneaded by a Banbury mixer by calender rolls through warming rolls. The thermoplastic elastomer composition of the present invention is processed under a temperature condition of 140°–250° C. in either case.

At the calender rolling step, sheets less in thickness variation and excellent in surface appearance are obtained by employing proper temperature condition and by adjusting banks. Furthermore, lamination with polyolefin foams such as polyethylene and polypropylene or polyurethane foams can be simultaneously carried out at the calender rolling step.

Embossing step will be explained. Various emboss patterns are used for improving touch and frictional characteristics in addition to the dicorative effect. Examples of the patterns are leather grain, satin and hairline. Various leather grains are used for interior automotive trims. A thermoplastic elastomer sheet softened by heating is processed between an embossing roll and a packing roll to transfer the rugged pattern of the embossing roll to the sheet. Heating in this case can be effected by employing an embossing roll heated by heat sources such as steam and heated oil or heating the sheet by hot air, infrared rays or electric heat. The heating method is unlimited.

Furthermore, use of a laminator embosser makes it possible to perform lamination with a foamed sheet simultaneously with embossing.

Blending ratio of TPE-I and TPE-II is in the range of 100/0 to 55/45% by weight, preferably 100/0 to 60/40, more preferably 95/5 to 60/40, most preferably 90/10 to 60/40% by weight.

If amount of TPE-II is larger than 45% by weight, 90% stress relaxation time at the embossing temperature of sheet (180° C.) becomes longer and the external stress applied for embossing remains unrelaxed in the sheet. This stress causes a relaxation phenomenon called debossing at the time of heat stretching in vacuum forming of sheet and decorating emboss patterns on the surface of the formed covering material disappear to damage the commercial value.

Moreover, there may be used a thermoplastic elastomer composition comprising TPE-I or TPE-I and TPE-II to which is additionally added at most 30% by weight of an olefinic polymer resin (E). Use of the olefinic polymer resin is very advantageous for processability into a sheet or vacuum forming of sheet, but causes decrease in flexibility. Therefore, addition in an amount of more than 30% by weight is not preferred.

A difference appears in dispersed particles of EPDM in resin matrix due to the difference in Mooney viscosity of EPDM between the thermoplastic elastomer (TPE-I) prepared using oil-extended EPDM-A and the thermoplastic elastomer (TPE-II) prepared using oil-extended EPDM-B. That is, in the case of TPE-I prepared using the copolymer rubber having a high Mooney viscosity, relatively large rubber particles of about 1–5 $\mu$m are independently present in resin matrix and in the case of TPE-II comprising the copolymer rubber having the lower Mooney viscosity, fine rubber particles of smaller than 1 $\mu$m are present in reticulate form.

The TPE-II where fine rubber particles are present in reticulate form is superior in mechanical properties such as flexibility and impact strength, but since the fine rubber particles are present in reticulate form, the resin surrounded by the reticulation of the rubber cannot sufficiently function as a matrix at the time of processing such as sheet formation or vacuum forming and cannot contribute to improvement of flowability and besides, the stress relaxation time under the condition of sheet embossing temperature (180° C.) is long and debossing is apt to occur by reheating at the time of vacuum forming and processability tends to deteriorate. On the other hand, in the case of TPE-I in which rubber particles are present independently from each other in the thermoplastic elastomer, the resin matrix contributes to improvement of flowability and thus, sheet processability and emboss pattern retain ability are superior and vacuum formability is relatively good, but mechanical properties are somewhat inferior.

According to the present invention, thermoplastic elastomer compositions having highly balanced properties and processability are obtained by TPE-I or blend of TPE-I and TPE-II which have advantages and disadvantages.

Methods for molding the thermoplastic elastomer compositions comprising TPE-I or TPE-I and TPE-II to prepare covering materials for industrial parts are exemplified below.

① Multilayer extrusion molding of the elastomer composition as a covering layer.

② Two-layer injection molding or insert molding of the elastomer composition as a covering layer.

③ Molding the elastomer composition into a sheet by a T-die sheet forming machine or a calender sheet forming machine to make a covering material and subjecting the covering material or a laminate prepared by laminating the covering material with a polyolefin resin sheet or a polyolefin foamed sheet to vacuum forming.

④ Molding the elastomer composition into a sheet by a T-die sheet forming machine or a calender sheet forming machine to make a covering material, subjecting the covering material or a laminate prepared by laminating the covering material with a polyolefin resin sheet or a polyolefin foamed sheet to vacuum forming and laminating the resulting product with a polyurethane foamed sheet.

⑤ Simultaneous molding of the covering material or laminate of ③ with a polystock (resin/woodflour mixture) or a fiber-reinforced plastic.

⑥ Stamping molding of the covering material or laminate of ③ with a plastic (if desired, a plastic containing inorganic fillers).

Use of the covering materials for industrial parts of the present invention are:

Automobile parts: internal covering materials such as instrument panels, console boxes, arm rests, head rests, door trims, rear panels, pillar trims, sunvisors, trunk room trims, trunk lid trims, air bag containers, seat buckles, head liners, glove boxes, steering wheel covers and ceiling materials.

Electrical appliance parts and office appliance parts: covering materials of housings such as television, video decks, washing machines, driers, cleaners, coolers, air conditioners, remote controller cases, microwave ovens, toasters, coffee makers, pots, jars, dinnerware washing machines, electric shavers, hair driers, microphones, headphones, beauty culture machines, CD cassette containers, personal computers, typewriters, projectors, telephone sets, copying machines, facsimile telegraphs, and telex devices.

Sports goods: covering materials for sports shoes decorative parts, grips of rackets and sports devices and goods for various ball games and saddles of bicycles, motor bicycles and tricycles.

Building parts and housing parts: covering materials for furniture, desks and chairs, covering materials for gates, doors and fences, covering materials for wall decorative materials, ceiling decorative materials and curtain walls, interior floorings for kitchens, lavatories, bathrooms, exterior floorings for veranda, terrace, balcony and car port, and cloths such as entrance mats, table cloths, coasters and ashtray cloths.

Other industrial parts: grips and hoses of electric tools and covering materials thereof and packing materials.

In addition, covering materials for bags, cases, files, pocket note books, albums, stationaries, camera bodies and toys such as dolls and outer frames of framed pictures and covering materials thereof.

The present invention will be explained in more detail by the following nonlimiting examples.

The following tests are effected for measurement of properties in the examples and comparative examples.

(1) Mooney viscosity ($ML_{1+4}$ 100° C.): ASTM D-927-57T; the following formula is applied to EPDM.

$\log (ML_1/ML_2) = 0.0066 (\Delta$ PHR$)$ wherein $ML_1$: Mooney viscosity of EPDM.

$ML_2$: Mooney viscosity of oil-extended EPDM.

$\Delta$ PHR: Oil-extension amount per 100 parts by weight of EPDM.

(2) MFR: Melt flow rate: JIS K6760; 230° C., 2.16 kg.

(3) Relaxation characteristics:

① Preparation of sample:

A press sheet is prepared using a thermoplastic elastomer pellets. The conditions for preparation are as follows.

Press temperature: 230° C.

Preheating: 5 minutes

Application of pressure: 5 minutes

Pressing pressure: 30 kg/cm² G

Cooling: 30° C.×5 minutes

Thickness of sheet: 2-3 mm

A disc sample of 2-3 mm in thickness and 25 mm in diameter is cut out from the press sheet.

② 90% stress relaxation time:

A disk sample of 2-3 mm in thickness and 25 mm in diameter is held between two parallel discs of the same diameter as the sample and a shear strain of 20% ($\gamma_{20}$) as defined below is instantaneously applied to the sample by a dynamic thermoelasticity measuring apparatus (RMS-800 manufactured by Reometrics Co.) at an atmospheric temperature of 180° C. A torque corresponding to strain is detected and the torque decreases with time from a maximum value (maximum torque). $\tau_{20}$ defined below is calculated from the maximum torque and modulus of elasticity ($G_{20}$) at the maximum torque is calculated.

Time required for modulus of elasticity reaching 10% of the modulus of elasticity $G_{20}$ is measured. This is a 90% stress relaxation time (sec).

Shear strain ($\gamma_{20}$) = $(R\theta/H)$

R: Radius of sample (mm)

H: Thickness of sample (mm)

$\theta$: Rotating angle (radian)

Shear stress ($\tau_{20}$) = $[2\ GcM/[\pi(R/10)^3]]$dyne/cm²

R: Radius (mm)

M: Maximum torque (g-cm)

Gc: Constant 980.7 dyne/g

Modulus of elasticity ($G_{20}$) = $\tau/\gamma_{20}$ dyne/cm²

(4) Sheet molding:

Sheet T of 400 mm in width and 0.8 mm in thickness is prepared from the thermoplastic elastomer composition by model S550-V4 sheet making apparatus manufactured by Tanabe Plastic Machine Co. (40 mm $\phi$ extruder, L/D=26, Dulmage screw, coathanger die) at a die temperature of 200° C., a screw revolution speed of 50 rpm and a take-up speed of 0.6 m/min. Leather grain pattern is applied to the resulting sheet T by an embossing roll to obtain a covering material for industrial parts.

(5) Evaluation of covering material and sheet T:

① Flexibility of covering material: Shore A hardness, Instantaneous maximum value.

② Emboss retention: Feeler type surface roughness meter (Surfcom 554A manufactured by Mitoyo Co.) is used.

$R_2$: Ten-point average surface roughness; measuring distance 25 mm; measuring speed 0.3 mm/sec; cut-off 2.5 mm or more:

Emboss retention is calculated by the following formula:

[$R_2$ of vacuum formed product]/[$R_2$ of covering material before vacuum formation]×100

③ Drape vacuum formation of covering material:

The sheet is subjected to drape vacuum forming by TF-1-16-VP vacuum forming machine manufactured by Nakakura Kikaku Co. at a surface temperature of covering material just before vacuum formation of 140°–190° C. to obtain a drape vacuum formed covering material having a quadrangular prismatic convex part having a bottom of 145 mm×140 mm and a top of 90 mm×90 mm with a height of 55 mm.

A pattern of squares of 10 mm in side is written on the covering material to be subjected to vacuum forming and extension rate is measured from enlarging ratio of the square after vacuum formation. The largest extension rate is about 150% when no rupture and reduction in thickness are seen and a good vacuum formed product is obtained (indicated by ◯).

(6) Preparation of thermoplastic elastomer:

The thermoplastic elestomers used in examples and comparative examples were prepared in the following manner using the oil-extended ethylene-propylene-nonconjugated diene terpolymer rubbers (oil-extended EPDM) mentioned in Table 1 and polypropylene resins (PP) mentioned in Table 2.

TABLE 1

| Oil-extended EPDM | A | B |
|---|---|---|
| $ML_{1+4}$ 100° C. | 242 | 143 |
| Propylene content (wt %) | 28 | 31 |
| Diene | ENB* | ENB |
| Iodine value | 11 | 10 |
| Oil (part by weight) | 105 | 42 |

*ENB: Ethylidenenorbornene

TABLE 2

| PP | PP-1 | PP-2 | PP-3 |
|---|---|---|---|
| Ethylene content (wt %) | 4.5 | — | — |
| MFR (g/10 min) | 1.1 | 11 | 2.0 |

Thermoplastic elastomer (TPE-I-1):

70 Parts by weight of oil-extended EPDM-A, 30 parts by weight of PP-3 and 0.4 part by weight of N,N'-m-phenylenebismaleimide as a crosslinking aid were kneaded at a temperature higher than the melting point of PP-1 for 7 minutes by a Banbury mixer and then pelletized to obtain master batch (M.B) pellets for crosslinking.

0.04 Part by weight of 2,5-di-methyl-2,5-di(t-butyl-peroxy)hexane was added to 100 parts by weight of M.B and the mixture was uniformly blended for 2 minutes by Henschel mixer.

The resulting blend was subjected to dynamic heat treatment at 230° C.±10° C. for about 30 seconds by a twin-screw kneader (TEX-44HC manufactured by Nihon Seikosho Co.) to obtain thermoplastic elastomer (TPE-I-1) pellets.

Thermoplastic elastomer (TPE-I-2):

Thermoplastic elastomer (TPE-I-2) pellets were obtained in the same manner as in preparation of TPE-I-1 except that PP-2 were used instead of PP-3.

Thermoplastic elastomer (TPE-II-1):

Thermoplastic elastomer (TPE-II-1) pellets were obtained in the same manner as in preparation of TPE-I-1 except that 70 parts by weight of oil-extended EPDM-B, 30 parts by weight of PP-1 and 0.2 part by weight of N,N'-m-phenylenebismaleimide as a crosslinking aid were used.

Thermoplastic elastomer (TPE-II-2):

Thermoplastic elastomer (TPE-II-2) pellets were obtained in the same manner as in preparation of TPE-I-1 except that 70 parts by weight of oil-extended EPDM-B, 30 parts by weight of PP-3 and 0.2 part by weight of N,N'-m-phenylenebismaleimide as a crosslinking aid were used.

EXAMPLES 1-6 AND COMPARATIVE EXAMPLES 1-4

The composition shown in Table 3 was molded into a sheet. The resulting sheet T and covering material were evaluated on flexibility, 90% stress relaxation time, drape vacuum formability and emboss retention. The results are shown in Table 3.

EXAMPLE 7

Hicoap U L-4001 (manufactured by Tokushu Shikiryo Kogyo Co.) was coated on the covering material obtained in Example 2 at a thickness of 1-3 μm as an undercoating composition for surface treatment and dried at 70° C. for 5 minutes. Furthermore, thereon was coated urethane elastomer topcoating composition, Hicoap VEU-684 (manufactured by Tokushu Shikiryo Kogyo Co.) and was dried to form a topcoat layer of 2-5 μm. On the back side was coated Joytack AD-471B (manufactured by Tokushu Shikiryo Kogyo Co.) for adhesion to urethane and dried to obtain a covering material.

The resulting covering material was subjected to drape vacuum forming in such a state that the back side contacted with a mold using a vacuum forming machine (TF-1-16-VP manufactured by Nakakura Kihan Co., mold: instrument panel model) to obtain a drape vacuum formed covering material.

On the back side of this covering material was laminated a semirigid polyurethane foam of 0.16 g/cm³ in density obtained by mixing and injecting isocyanate and polyol manufactured by Sumitomo Bayer Urethane Co. at 1:2 to obtain an instrument panel laminate. The laminate had a proper flexibility.

EXAMPLE 8

In preparing the covering material of Example 4, a polypropylene foam (PPAM 25030 manufactured by Toray Industries, Inc.) was laminated on the back side of the covering material to obtain a laminate. The front side of the laminate was subjected to the same surface treatment as in Example 7 and this laminate was subjected to drape vacuum forming by the same mold as used in Example 7 to obtain an instrument panel laminate.

TABLE 3

| | Example | | | | | | Comparative Example | | | |
|---|---|---|---|---|---|---|---|---|---|---|
| | 1 | 2 | 3 | 4 | 5 | 6 | 1 | 2 | 3 | 4 |
| TPE-I-1 | 100 | | 70 | | 70 | | 50 | | | |
| TPE-I-2 | | 100 | | 70 | | 80 | | | | 80 |
| TPE-II-1 | | | 30 | | | 20 | 50 | 100 | | 20 |
| TPE-II-2 | | | | 30 | 30 | | | | 100 | |
| PP-2 | | | | | | 10 | | | | 80 |
| 90% stress relaxation time (sec) | 5.3 | 1.2 | 9.2 | 3.7 | 9.7 | 2.2 | 15 | 39 | 50 | 1.1 |
| Flexibility | 75 | 81 | 77 | 82 | 82 | 85 | 78 | 80 | 84 | 92 |
| Drape vacuum forming | ⊙ | ⊙ | ○ | ○ | ○ | ⊙ | ○ | Break | Break | ⊙ |
| Emboss retention (%) | 71 | 72 | 63 | 67 | 61 | 70 | 45 | 39 | 37 | 75 |

As explained above, the present invention provides a thermoplastic elastomer composition which can give covering materials required to have highly balanced flexibility and processability, especially covering sheets having emboss pattern improved in retainability of emboss pattern after subjected to drape vacuum forming. The present invention further provides a covering material for industrial parts which comprises said composition and a laminate comprising said covering material.

What is claimed is:

1. A thermoplastic elastomer composition which comprises:
   (i) 60–90% by weight of a thermoplastic elastomer I obtained by partially crosslinking a mixture consisting essentially of (A) 50–90 parts by weight of a first oil-extended olefinic copolymer rubber containing 60–150 parts by weight of a first mineral oil for every 100 parts by weight of the first olefinic copolymer rubber having a 100° C. Mooney viscosity ($ML_{1+4}$ 100° C.) of 200–350 and (C) 50–10 parts by weight of a first olefinic polymer resin, (ii) 40–10% by weight of a thermoplastic elastomer II obtained by partially crosslinking a mixture consisting essentially of (B) 50–80 parts by weight of a second oil-extended olefinic copolymer rubber containing 10–60 parts by weight of a second mineral oil for every 100 parts by weight of the second olefinic copolymer rubber having a 100° C. Mooney viscosity ($ML_{1+4}$ 100° C.) of 120–200 and (D) 50–20 parts by weight of a second olefinic polymer resin, and (iii) (E) 0–30% by weight of a third olefinic polymer resin, and said composition having a 90% stress relaxation time of about 0.1–10 seconds in measurement of viscoelasticity at 180° C.

2. An elastomer composition according to claim 1, wherein the olefinic polymer resins (C), (D) and (E) are polypropylene resins.

3. An elastomer composition according to claim 2, wherein the polypropylene resins are homopolypropylene and/or random or block copolymer resins of propylene and α-olefins of 2 or more carbon atoms.

4. An elastomer composition according to claim 1, wherein the olefinic copolymer rubbers (A) and (B) are copolymer rubbers of ethylene and at least one member selected from the group consisting of propylene, 1-butene, a nonconjugated diene, and a combination thereof.

5. An elastomer composition according to claim 4, wherein the nonconjugated dienes are dicyclopentadiene and/or ethylidenenorbornene.

6. A covering material for industrial parts obtained by drape vacuum forming of the elastomer composition of claim 1.

7. A covering material according to claim 6, wherein the industrial parts are interior automotive trims.

8. A covering material according to claim 7, wherein the interior automotive trims are instrument panels.

9. A covering material according to claim 7, wherein the interior automotive trims are door trims.

10. A laminate obtained by laminating a polyolefin foam or polyurethane foam on the covering material of claim 6.

11. A thermoplastic elastomer composition which comprises:

(i) 60–90% by weight of a thermoplastic elastomer I obtained by partially crosslinking a mixture consisting essentially of (A) 50–90 parts by weight of a first oil-extended copolymer rubber of ethylene and at least one member selected from the group consisting of propylene, 1-butene, a nonconjugated diene, and a combination thereof, containing 60–150 parts by weight of a first mineral oil for every 100 parts by weight of the first olefinic copolymer rubber having a 100° C. Mooney viscosity ($ML_{1+4}$ 100° C.) of 200–350 and (C) 50–10 parts by weight of a first polypropylene resin, (ii) 40–10% by weight of a thermoplastic elastomer II obtained by partially crosslinking a mixture consisting essentially of (B) 50–80 parts by weight of a second oil-extended copolymer rubber of ethylene and at least one member selected from the group consisting of propylene, 1-butene, a nonconjugated diene, and a combination thereof, containing 10–60 parts by weight of a second mineral oil for every 100 parts by weight of the second olefinic copolymer rubber having a 100° C. Mooney viscosity ($ML_{1+4}$ 100° C.) of 120–200 and (D) 50–20 parts by weight of a second polypropylene resin, and (iii) (E) 0–30% by weight of a third polypropylene resin, and said composition having a 90% stress relaxation time of 0.1–10 seconds in measurement of viscoelasticity at 180° C.

12. A thermoplastic elastomer composition according to claim 11, wherein the non-conjugated diene is selected from the group consisting of dicyclopentadiene, 1,4-hexadiene, cyclooctadiene, methylenenorbornene, and ethylidenenorbornene.

* * * * *